(12) United States Patent
Jung et al.

(10) Patent No.: US 10,900,793 B2
(45) Date of Patent: Jan. 26, 2021

(54) VEHICLE PATH GUIDING APPARATUS AND METHOD

(71) Applicant: Samsung Electronics Co., Ltd., Suwon-si (KR)

(72) Inventors: Kyungboo Jung, Seoul (KR); Young Hun Sung, Hwaseong-si (KR); KeeChang Lee, Seongnam-si (KR); Won-Hee Lee, Hwaseong-si (KR); Hwi-Ryong Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/618,729

(22) Filed: Jun. 9, 2017

(65) Prior Publication Data

US 2018/0209802 A1 Jul. 26, 2018

(30) Foreign Application Priority Data

Jan. 26, 2017 (KR) .......................... 10-2017-0012864

(51) Int. Cl.
*G01C 21/34* (2006.01)
*G08G 1/137* (2006.01)
(Continued)

(52) U.S. Cl.
CPC ..... *G01C 21/3415* (2013.01); *G01C 21/3602* (2013.01); *G01C 21/3658* (2013.01);
(Continued)

(58) Field of Classification Search
CPC ............ G01C 21/3415; G01C 21/3658; G01C 21/3602; G01C 21/3667; G01C 21/3635;
(Continued)

(56) References Cited

U.S. PATENT DOCUMENTS

| 6,285,317 | B1* | 9/2001 | Ong .................. | G01C 21/3635 340/995.2 |
| 2007/0021912 | A1* | 1/2007 | Morita ............... | G01C 21/3602 701/431 |

(Continued)

FOREIGN PATENT DOCUMENTS

| KR | 10-1085390 B1 | 11/2011 |
| KR | 10-2015-0034512 A | 4/2015 |

(Continued)

OTHER PUBLICATIONS

Partial European Search Report dated Mar. 15, 2018, in corresponding European Application No. 17188546.0 (11 pages, in English).

*Primary Examiner* — Michael V Kerrigan
(74) *Attorney, Agent, or Firm* — NSIP Law

(57) ABSTRACT

A vehicle path guiding method includes: generating, based on location information of a vehicle determined using first sensor data, vehicle path information to guide the vehicle to a path along which the vehicle is to be driven; determining a driving lane in which the vehicle is travelling based on an ambient image of the vehicle; correcting the generated vehicle path information based on a location of the determined driving lane; and displaying the corrected vehicle path information.

23 Claims, 10 Drawing Sheets

(51) Int. Cl.
*G01C 21/36* (2006.01)
*G06K 9/00* (2006.01)

(52) U.S. Cl.
CPC ..... *G01C 21/3667* (2013.01); *G06K 9/00798* (2013.01); *G06K 9/00805* (2013.01); *G08G 1/137* (2013.01)

(58) Field of Classification Search
CPC . G06K 9/00798; G06K 9/00805; G08G 1/137
See application file for complete search history.

(56) References Cited

U.S. PATENT DOCUMENTS

| | | | | |
|---|---|---|---|---|
| 2009/0222203 | A1* | 9/2009 | Mueller | G01C 21/3647 701/431 |
| 2014/0249748 | A1 | 9/2014 | Strassenburg-Kleciak | |
| 2015/0117723 | A1 | 4/2015 | Joshi et al. | |
| 2016/0291134 | A1* | 10/2016 | Droz | G01S 7/4817 |
| 2018/0045516 | A1* | 2/2018 | Sumizawa | G01C 21/005 |

FOREIGN PATENT DOCUMENTS

| | | |
|---|---|---|
| KR | 10-1612822 B1 | 4/2016 |
| WO | WO 2014/166532 A1 | 10/2014 |

* cited by examiner

VEHICLE PATH GUIDING APPARATUS AND METHOD

CROSS-REFERENCE TO RELATED APPLICATIONS

This application claims the benefit under 35 USC § 119(a) of Korean Patent Application No. 10-2017-0012864 filed on Jan. 26, 2017, in the Korean Intellectual Property Office, the entire disclosure of which is incorporated herein by reference for all purposes.

BACKGROUND

1. Field

The following description relates to vehicle navigation technology.

2. Description of Related Art

Vehicle navigation technology is, for example, technology for calculating a path from a current location of a vehicle to a destination based on a preset reference and providing the calculated path to a user. The vehicle navigation technology may include technology for real-time communication of traffic information, technology for recognizing a current location, technology for detecting a destination on a map, technology for determining information on a vehicle path from a current location to a destination, and technology providing information on a vehicle path.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle path guiding method includes: generating, based on location information of a vehicle determined using first sensor data, vehicle path information to guide the vehicle to a path along which the vehicle is to be driven; determining a driving lane in which the vehicle is travelling based on an ambient image of the vehicle; correcting the generated vehicle path information based on a location of the determined driving lane; and displaying the corrected vehicle path information.

The correcting of the generated vehicle path information may include matching the vehicle path information and a lane model generated based on the ambient image of the vehicle, and correcting the vehicle path information based on a location of the driving lane corresponding to the lane model.

The generating of the vehicle path information may include detecting an intersection in the ambient image of the vehicle, correcting the location information of the vehicle based on location information of the detected intersection, and generating the vehicle path information based on the corrected location information.

The detecting of the intersection may include extracting distance information of the vehicle from the ambient image of the vehicle, generating a nearby map based on the distance information, and detecting the intersection using the nearby map.

The generating of the vehicle path information may include extracting distance information of the vehicle from the ambient image of the vehicle, and correcting the location information of the vehicle based on the distance information.

The correcting of the location information may include generating a nearby map based on the distance information, comparing the nearby map and the location information of the vehicle, and correcting the location information of the vehicle based on a comparison result.

The determining of the driving lane may include generating a lane model, and determining the driving lane based on the lane model.

The generating of the lane model may include extracting distance information of the vehicle from the ambient image of the vehicle, and generating the lane model based on the distance information and location information of a lane determined using second sensor data.

The second sensor data may be acquired from a light detection and ranging (LiDAR) sensor or a radio detection and ranging (RADAR) sensor.

The generating of the vehicle path information may include generating vehicle path information of a two-dimensional (2D) map, converting the 2D map into a three-dimensional (3D) map, and converting the vehicle path information of the 2D map into vehicle path information of the 3D map based on a result of the converting of the 2D map.

The first sensor data may be acquired from an inertial measurement unit (IMU) or a global positioning system (GPS).

A non-transitory computer-readable storage medium may store instructions that, when executed by a processor, cause the processor to perform the method.

In another general aspect, a vehicle path guiding apparatus includes: a processor configured to generate, based on location information of a vehicle determined using first sensor data, vehicle path information to guide the vehicle to a path along which the vehicle is to be driven, determine a driving lane in which the vehicle is travelling based on an ambient image of the vehicle, correct the generated vehicle path information based on a location of the determined driving lane, and display the corrected vehicle path information.

The processor may be further configured to match the vehicle path information and a lane model generated based on the ambient image of the vehicle, and correct the vehicle path information based on a location of the driving lane corresponding to the lane model.

The processor may be further configured to detect an intersection in the ambient image of the vehicle, correct the location information of the vehicle based on location information of the detected intersection, and generate the vehicle path information based on the corrected location information.

The processor may be further configured to extract distance information of the vehicle from the ambient image of the vehicle, and correct the location information of the vehicle based on the distance information.

The vehicle path guiding apparatus may further include: an inertial measurement unit (IMU) or a global positioning system (GPS) configured to acquire the first sensor data.

The processor may be further configured to determine the driving lane based on a lane model generated based on the ambient image of the vehicle and location information of a lane determined using second sensor data.

The vehicle path guiding apparatus may further include: a light detection and ranging (LiDAR) sensor or a radio detection and ranging (RADAR) sensor configured to acquire the second sensor data.

In another general aspect, a vehicle path guiding method includes: determining, using global positioning system (GPS) data, location information of a vehicle; generating, based on the determined location information, vehicle path information to guide the vehicle to a driving path, wherein the vehicle path information has a road-level accuracy; determining a driving lane in which the vehicle is travelling based on an image of the vehicle; correcting the generated vehicle path information based on a location of the determined driving lane; and outputting the corrected vehicle path information through any one or both of a display and a speaker.

The image of the vehicle may include a multi-view image.

The method may further include: detecting an intersection in the multi-view image; and correcting the location information of the vehicle based on a distance between the vehicle and the intersection.

The generating of the vehicle path information may include converting vehicle path information of a 2D map into vehicle path information of a 3D map.

Other features and aspects will be apparent from the following detailed description, the drawings, and the claims.

Figure 1A:
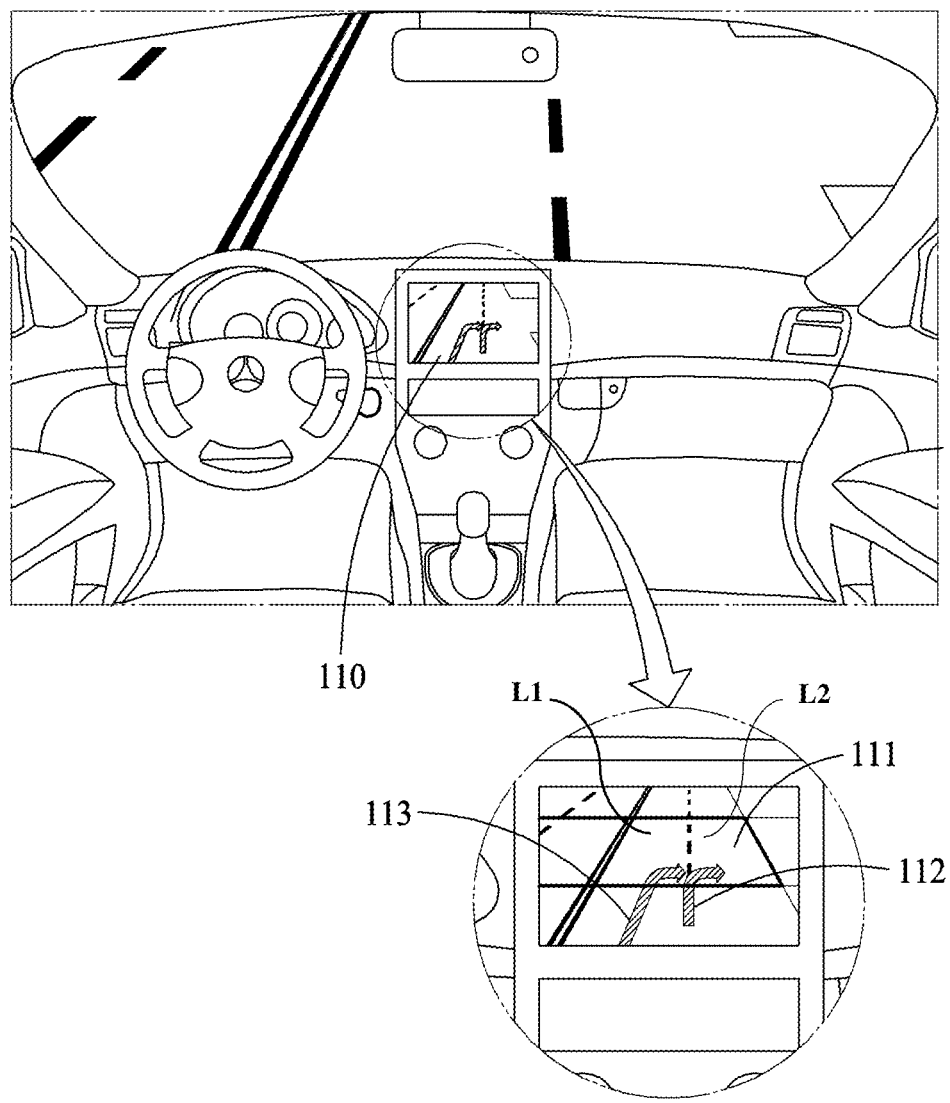
FIG. 1A illustrates an example of a display on which a vehicle path is displayed based on a vehicle path guiding method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

A function or an operation illustrated in a block may be performed not in a sequential order according to examples. For example, functions or operations illustrated in successive blocks may be actually performed concurrently, or an order of the blocks may be changed based on related functions or operations.

Hereinafter, reference will now be made in detail to examples with reference to the accompanying drawings, wherein like reference numerals refer to like elements throughout.

FIG. 1A illustrates an example of a display 110 on which a vehicle path is displayed based on a vehicle path guiding method.

A vehicle path guiding apparatus determines a driving lane using an ambient image of a vehicle and correct vehicle path information of a 2D map based on the driving lane. The ambient image includes a multi-view image of the vehicle. The vehicle path guiding apparatus is applicable to a field of navigation for a vehicle.

A vehicle as described herein may be any means of transportation having an engine driven to move people or objects such as a car, a bus, a motorcycle, or a truck. The driving lane is also referred to as an ego lane.

The vehicle path information of the 2D map has a road-level accuracy and may not have an accuracy sufficient to identify a lane included in a road. The vehicle path guiding apparatus corrects the vehicle path information of the 2D map based on location information of the road including the driving lane such that the vehicle path information has a lane-level accuracy. On a road including multiple lanes, the driving lane corresponds to lateral information and thus, the vehicle path information is corrected in a lateral direction.

The vehicle path guiding apparatus detects an intersection from the ambient image of the vehicle and corrects vehicle location information based on location information of the intersection. The vehicle path guiding apparatus corrects the vehicle location information on the 2D map based on a distance between the vehicle and the intersection. When the intersection is detected in front of the vehicle, the location information of the intersection corresponds to longitudinal information. Thus, the vehicle path guiding apparatus improves a longitudinal accuracy of the vehicle path information.

The vehicle path guiding apparatus realizes a navigation service based on an augmented reality (AR). The AR-based navigation service is also referred to as a realistic image-based navigation. A navigation service provided by combining vehicle path information to a background of an AR realized two-dimensionally or three-dimensionally is also referred to as a graphic-based navigation. In terms of the graphic-based navigation, a user may need to understand a meaning of graphics and match a result of the understanding to an actual environment. Thus, the user may experience a cognitive burden. To reduce such cognitive burden, a precise rendering of the graphics may be required and thus, more resources may be used for the precise rendering. With respect to the realistic image-based navigation, the user may match a realistic image to the actual environment and thus, the cognitive burden experienced by the user may be reduced.

In an example, the vehicle path guiding apparatus employs the realistic image-based navigation. In such an example, the vehicle path guiding apparatus provides a result of a combination of vehicle path information and a realistic image of a driving point of view. For example, the vehicle path guiding apparatus acquires an image of an actual road viewed by the user using a camera, maps vehicle path information to the image of the actual road, and displays a result of the mapping. As such, when the vehicle path guiding apparatus employs the realistic image-based navigation, the user may view the vehicle path information in the actual environment unlike the graphic-based navigation and thus, experience an enhanced reality.

With regard to technology for providing vehicle path information, the vehicle path guiding apparatus provides the vehicle path information through a visual output. Referring to FIG. 1A, the vehicle path information is displayed on the display 110 mounted on a vehicle. The vehicle path guiding apparatus captures a forward image at a driving point of view using a camera, displays the forward image, and maps the vehicle path information to the forward image, thereby increasing a realism of the visual output.

Although FIG. 1A illustrates the display 110 mounted on the vehicle as an example, a type of the display 110 is not limited to the illustrated example. The display 110 may also be provided in a detachable form. The display 110 is included in, for example, a PMP, a DMB or a DMB/PMP integrated navigation terminal. Also, the vehicle path guiding apparatus may display the vehicle path information on a display of a smartphone.

The vehicle path information includes guide information such as an indication of a direction matching the forward image of the driving point of view, a starting point and a destination, a driving time to reach the destination, and a distance to the destination. The vehicle path information is indicated, for example, by graphics such as an arrow, an icon, and a text.

The vehicle path guiding apparatus acquires vehicle location information using a satellite navigation system, for example, a global positioning system (GPS). The vehicle location information acquired by the GPS may include an error. As shown in FIG. 1A, when an intersection 111 is detected in a driving direction of the vehicle, the vehicle path guiding apparatus corrects the vehicle location information based on location information of the intersection 111 to increase a longitudinal accuracy.

For example, the vehicle path guiding apparatus generates vehicle path information 112 including a path from a current location of the vehicle to a destination based on a preset reference. In this example, the preset reference includes a reference such as a minimum time or a minimum distance. The vehicle path information 112 is calculated in consideration of a traffic condition or a type of road, such as a highway. Still referring to FIG. 1A, in the vehicle path information 112, a direction to a subsequent junction relative to the current location of the vehicle is displayed using graphics, for example, an arrow.

When the accuracy of the vehicle path information 112 is insufficient to identify a lane, the vehicle path guiding apparatus displays right-turn information on the display 110 irrespective of a lane. Even when the vehicle is currently in a first lane L1, the vehicle location information acquired from the GPS may correspond to a location between the first lane L1 and a second lane L2. In this example, because a starting point of the vehicle path information 112 is between the first lane L1 and the second lane L2, the vehicle path information 112 may be inaccurate.

The vehicle path guiding apparatus corrects the vehicle path information 112 based on driving lane information. As illustrated in FIG. 1A, when the driving lane of the vehicle is the first lane L1, the vehicle path guiding apparatus corrects the current location of the vehicle to be the first lane L1 and corrects the vehicle path information 112 to be corrected vehicle path information 113, of which a starting point is the first lane L1. As such, by correcting the starting point of the vehicle path information based on the driving lane information, the vehicle path guiding apparatus increases the lateral accuracy of the corrected vehicle path information 113.

Figure 1B:
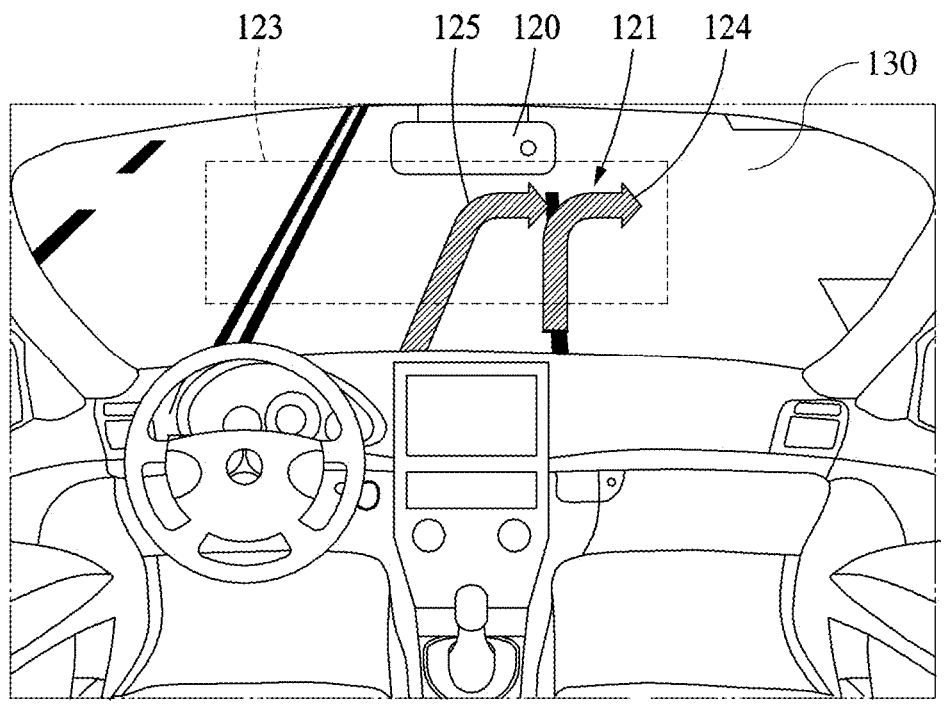
FIG. 1B illustrates an example of a head-up display on which a vehicle path is displayed based on a vehicle path guiding method.

FIG. 1B illustrates an example of a head-up display (HUD) 120 on which a vehicle path is displayed based on a vehicle path guiding method.

Referring to FIG. 1B, a vehicle path guiding apparatus visually provides vehicle path information. The vehicle path guiding apparatus displays the vehicle path information on a windshield 130 instead of a terminal. When the vehicle path information is projected onto the windshield 130, a user acquires the vehicle path information while maintaining a driving point of view. The vehicle path guiding apparatus uses the windshield 130 to prevent an attention diversion of the user and reduce a cognitive burden experienced by the user, such that the user drives the vehicle with increased convenience and safety.

For example, the vehicle path guiding apparatus projects vehicle path information onto the windshield using the HUD 120. The HUD 120 is, for example, a device disposed upward a point of gaze of the user to project an image. The HUD 120 displays traffic information or driving information of the vehicle on an area of the windshield 130 facing a driver seat so as to minimize a motion of an eye of the user. A projection area 123 of the HUD 120 may be biased toward the driver seat for the convenience of the user.

The vehicle path guiding apparatus acquires vehicle location information from a GPS. The vehicle location information acquired from the GPS may include an error of about 10 meters (m) in general.

The vehicle path guiding apparatus acquires a multi-view image using, for example, a stereo camera. When the multi-view image includes an intersection 121, the vehicle path guiding apparatus acquires location information of the intersection 121 from the multi-view image and corrects vehicle path information. Since a distance from the vehicle to the intersection 121 is corrected, the vehicle location information is corrected in a longitudinal direction.

Also, the vehicle path information acquired from the GPS may be laterally inaccurate. Referring to FIG. 1B, in an example, a current location of a vehicle is between a first lane and a second lane. The vehicle path guiding apparatus calculates an optimal path based on a preset reference and displays vehicle path information 124 on the windshield 130. Because the current location of the vehicle is inaccurate, a starting point of the vehicle path information 124 may be inaccurate.

The vehicle path guiding apparatus analyzes the multi-view image of the vehicle and determines a driving lane. The vehicle path guiding apparatus corrects the vehicle path information 124 based on location information of a driving lane. The driving lane is determined to be a first lane and, thus, the starting point of the vehicle path information 124 is corrected to be the first lane. Accordingly, the vehicle path information 124 is corrected to be second, corrected vehicle path information 125. Through the process of correcting the vehicle path information 124 based on location information of a driving lane, the corrected vehicle path information 125 achieves a lane-level accuracy in a lateral direction.

Figure 2:
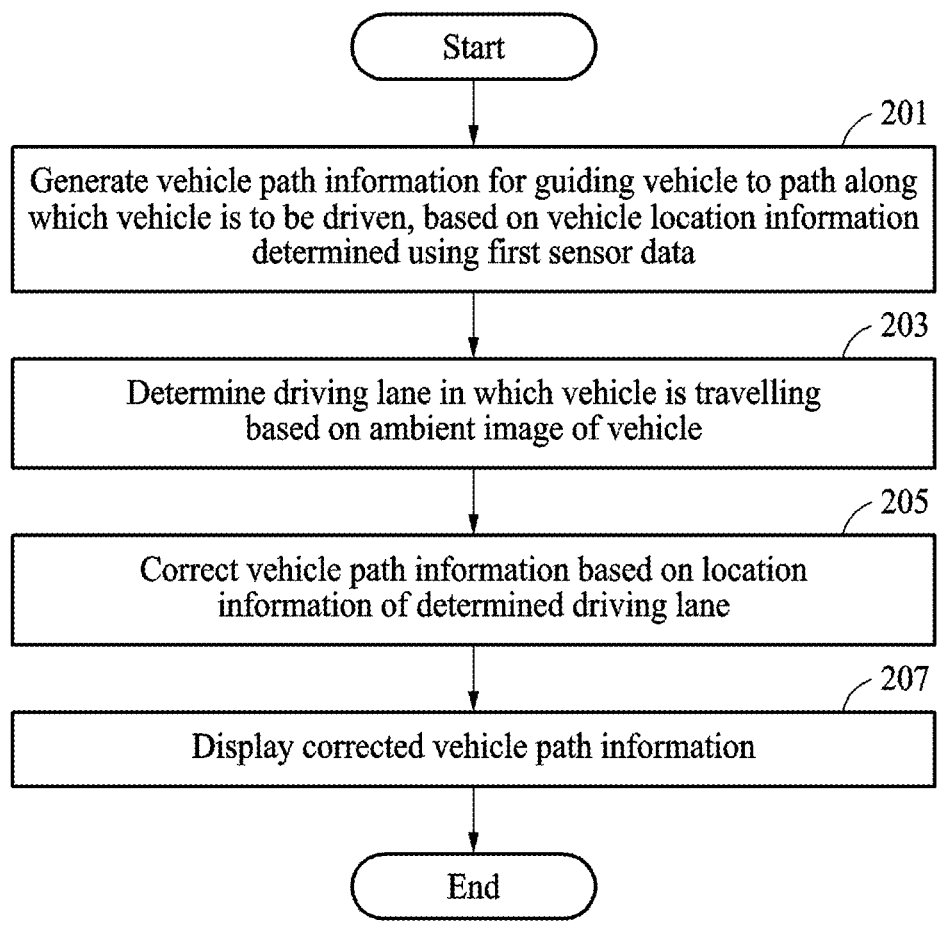
FIG. 2 illustrates an example of a vehicle path guiding method.

FIG. 2 illustrates an example of a vehicle path guiding method.

Referring to FIG. 2, in operation 201, the vehicle path guiding apparatus generates vehicle path information for guiding a vehicle to a path along which the vehicle is to be driven, based on vehicle location information determined using first sensor data. For example, a first sensor includes an inertial measurement unit (IMU) or a satellite navigation system. The satellite navigation system is also referred to as, for example, a global positioning system (GPS) or a GPS sensor. The first sensor data indicates primary data acquired from the GPS or the IMU. The vehicle location information determined based on the first sensor data has an accuracy corresponding to a road level. The vehicle path guiding apparatus calculates an optimal path based on a preset reference based on destination information and the vehicle location information, which may be relatively inaccurate.

In operation 203, the vehicle path guiding apparatus determines a driving lane in which the vehicle is travelling based on an ambient image of the vehicle. The ambient image includes a multi-view image. The vehicle path guiding apparatus acquires distance information of the vehicle from the multi-view image, combines the distance information and location information of a lane, and analyzes the lane. Based on a result of analyzing the lane, the driving lane of the vehicle is determined.

In operation 205, the vehicle path guiding apparatus corrects the vehicle path information based on location information of the determined driving lane. Because a lane is not distinguishable in the vehicle location information determined based on the first sensor data, the determined vehicle location information may not have an accuracy corresponding to a lane level. The vehicle path guiding apparatus increases the accuracy of the vehicle location information to reach the lane level by correcting a current location of the vehicle based on the location information of the driving lane. Due to an increase in the accuracy of the vehicle location information, an accuracy of the vehicle path information also increases.

In operation 207, the vehicle path guiding apparatus displays the corrected vehicle path information. The vehicle path guiding apparatus uses, for example, the head-down display of FIG. 1 or the HUD of FIG. 2. The vehicle path guiding apparatus provides a navigation service through a visual output and an auditory output, simultaneously. For example, the vehicle path guiding apparatus outputs contents corresponding to the vehicle path information with a voice while displaying the vehicle path information.

Figure 3:
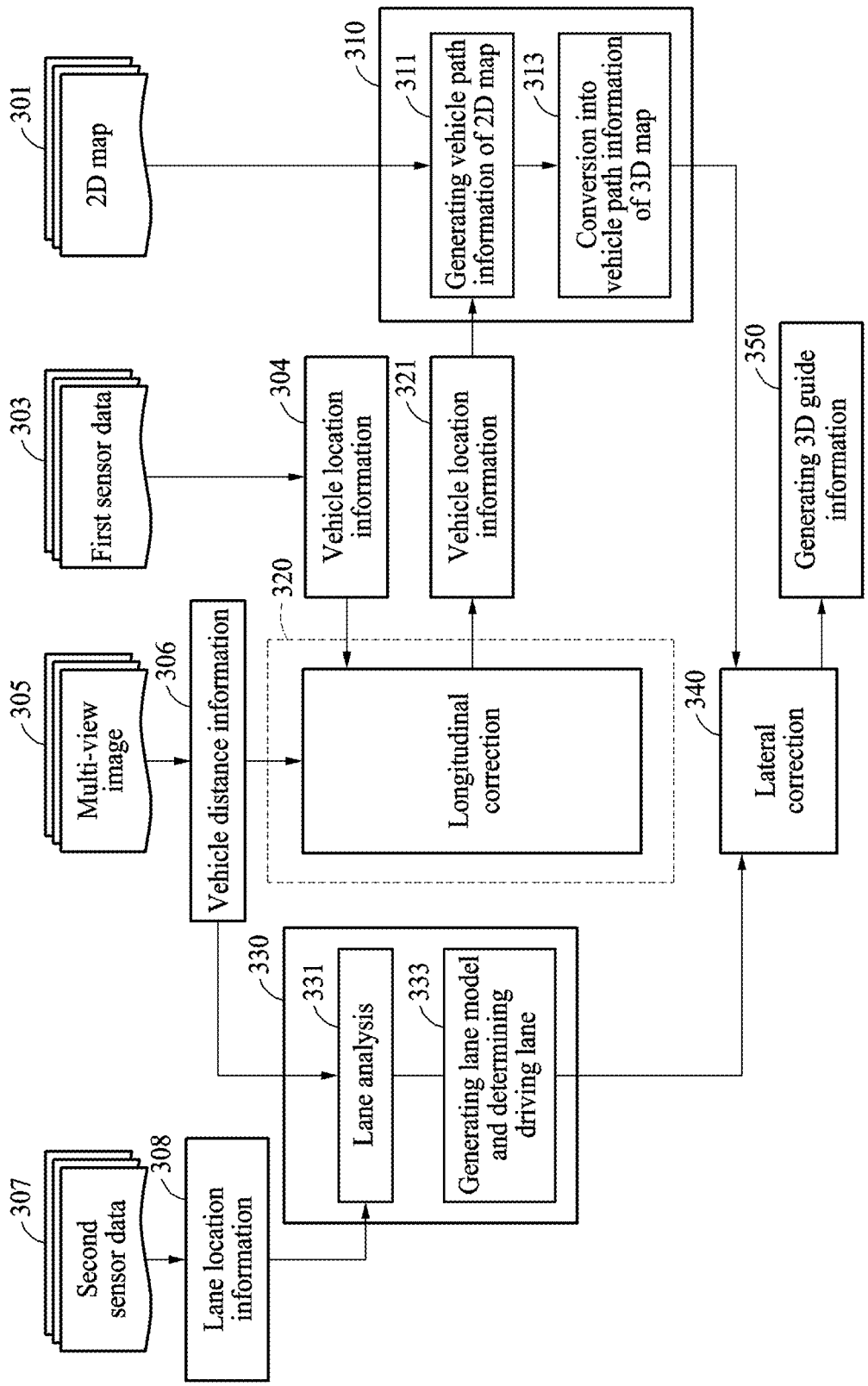
FIG. 3 illustrates another example of a vehicle path guiding method.

FIG. 3 illustrates another example of a vehicle path guiding method.

A vehicle path guiding apparatus generates vehicle path information based on vehicle location information and laterally corrects the vehicle path information based on a lane analysis result. The vehicle path guiding apparatus generates three-dimensional (3D) guide information including the corrected vehicle path information. The vehicle path guiding apparatus displays the 3D guide information.

The vehicle path guiding apparatus generates vehicle path information for guiding a vehicle to a path along which the vehicle is to be driven, based on vehicle location information determined using first sensor data. Also, the vehicle path guiding apparatus extracts distance information of the vehicle from a multi-view image and longitudinally corrects the vehicle location information before generating the vehicle path information.

As illustrated in FIG. 3, in operation 303, the vehicle path guiding apparatus receives the first sensor data to generate the vehicle path information. The first sensor data includes raw data acquired from an IMU or a GPS. The GPS is a system of acquiring a location of a target using a satellite orbiting periodically. The vehicle path guiding apparatus receives the raw data by receiving a unique frequency transmitted from a satellite with which a communication is available at a location of the vehicle.

In operation 304, the vehicle path guiding apparatus acquires the vehicle location information based on the first sensor data. The vehicle path guiding apparatus acquires the vehicle location information using the GPS.

An accuracy of a civil satellite navigation system to be used by the vehicle path guiding apparatus is maximally about 10 m, minimally starting from 30 m or less. An error of the GPS increases on a straight road in comparison to a curved road. When the GPS is applied, the vehicle path guiding apparatus identifies a road on which the vehicle is located. Thus, when only the GPS is used, the vehicle path guiding apparatus a road-level accuracy. A lane determined by a lane marking has a width between about 3 and 3.6 m in general. Since the width of the lane is less than 4 m, the vehicle path guiding apparatus may not accurately acquire the road on which the vehicle is located, using the GPS.

The vehicle path guiding apparatus corrects the vehicle location information based on the first sensor data received from the IMU to increase the accuracy of the vehicle path information. The IMU includes a gyro sensor and an acceleration sensor with respect to three axes orthogonal to one another to measure an inertial quantity of a moving vehicle. The vehicle path guiding apparatus measures a speed and a moving direction of the vehicle using the IMU. The vehicle path guiding apparatus corrects the vehicle location information acquired from the GPS based on the speed and the moving direction of the vehicle. For example, when the vehicle passes a tunnel in which the GPS is unavailable, the vehicle path guiding apparatus calculates the speed and the moving direction of the vehicle based on the most recent vehicle location information so as to acquire the vehicle location information in the tunnel.

The vehicle path guiding apparatus longitudinally corrects the vehicle location information using an ambient image of the vehicle to increase the accuracy. The ambient image includes a forward image in terms of a direction and a multi-view image in terms of a type of image, but is not limited to these examples. Thus, all images including information to be used for correcting the vehicle location information may be applicable.

Still referring to FIG. 3, in operation 305, the vehicle path guiding apparatus acquires the multi-view image. The multi-view image is acquired using stereo cameras, for example. For example, the vehicle path guiding apparatus acquires left and right images at different points of view using two stereo cameras. A stereo camera is also referred to as, for example, a multi-view camera.

The vehicle path guiding apparatus performs visual driving distance measurement, for example, a visual odometry (VO) using the multi-view image of an environment around the vehicle. A VO scheme indicates a scheme of measuring a distance between a vehicle and a captured target using an image. The vehicle path guiding apparatus detects matching points of left and right images corresponding to a single point on a 3D space through a stereo matching. The vehicle path guiding apparatus performs the stereo matching through, for example, an area-based matching, a feature-based matching and an energy-based matching.

The vehicle path guiding apparatus extracts depth information based on a difference between the detected matching points. The depth information is associated with a distance between the vehicle and the captured target. The vehicle path guiding apparatus calculates an angle of view, a posture, and a location of the stereo camera corresponding to a point of view at which the target is captured using internal and external parameters of the stereo camera.

Referring to FIG. 3, operation 306, the vehicle path guiding apparatus extracts the distance information of the vehicle from the ambient image of the vehicle. The vehicle path guiding apparatus calculates the distance information of the vehicle based on information on a position of the stereo camera in the vehicle, the angle of view, the posture, and the location of the stereo camera. In this example, the distance information of the vehicle is associated with a relative distance between the vehicle and the captured target. Also, the vehicle path guiding apparatus calculates driving information including a travel amount or a rotation amount of the vehicle by analyzing the distance information of the vehicle over time. The driving information of the vehicle is associated with a relative travel amount or rotation amount.

In operation 320, the vehicle path guiding apparatus corrects the vehicle location information acquired from the GPS based on the driving information or the distance information of the vehicle. When the multi-view image includes the forward image, the distance information of the vehicle is associated with a longitudinal direction and thus, the vehicle location information is corrected in the longitudinal direction. When a longitudinal correction is performed in operation 320, the corrected vehicle location information is output in operation 321, and the corrected vehicle location information is an input for operation 310. Since the longitudinal correction is performed as necessary, the vehicle location information extracted from the first sensor data in operation 304 is the output for operation 321 and the input for operation 310 when the longitudinal correction is not performed in operation 320.

Still referring to FIG. 3, in operation 310, the vehicle path guiding apparatus generates the vehicle path information based on a 2D map 301 and the vehicle location information output in operation 321. The vehicle path guiding apparatus generates vehicle path information of the 2D map in operation 311.

A map to acquire absolute coordinates of the vehicle is required to acquire vehicle location information and a destination, and generate vehicle path information. Thus, the 2D map or a 3D map is applied to a vehicle navigation system. Using the 3D map, an accuracy on acquiring a location of the vehicle increases and the vehicle path information is provided with an increased realism. However, the 3D map is difficult to construct, and to operate a navigation service using the 3D map, a greater amount of resources are required when compared to the 2D map.

The 2D map is easier to construct than the 3D map. Also, the 2D map is widely used by map service providers and, therefore, has a relatively high stability. By using the 2D map, the vehicle path guiding apparatus may reduce costs for constructing the 3D map, and may operate the navigation service using a lesser amount of resources in comparison to using the 3D map.

In operation 313, the vehicle path guiding apparatus converts the vehicle path information of the 2D map into vehicle path information of the 3D map. The vehicle path guiding apparatus converts the vehicle path information into a 3D image of a driving point of view. In such process, the 2D map is converted into the 3D map. In this example, the 3D map is not be a map constructed based on a traditional method. The 3D map is used for a matching with the lane model. For the matching with the lane model, a set of feature points included in the 2D map is three-dimensionally converted. Also, the entire 2D map may not need to be converted into the 3D map. A selected portion of the 2D map corresponding to a predetermined range (e.g., distance) from the vehicle may be converted into the 3D map. The vehicle path guiding apparatus converts the 2D map, or the selected portion of the 2D map, into the 3D map, and converts the vehicle path information of the 2D map or the selected portion of the 2D map into the vehicle path information of the 3D map. Such a 3D conversion process is performed to provide an augmented reality by mapping vehicle path information to a realistic image. In this example, the lane model includes a 3D lane model. The lane model is also matched to the 2D map.

The vehicle path guiding apparatus corrects the vehicle path information based on lane location information to increase an accuracy of the vehicle path information, which may correspond to a lateral correction of operation 304. As shown in FIG. 3, in operation 307, the vehicle path guiding apparatus receives second sensor data used for the lateral correction performed in operation 304. The second sensor data includes raw data received from a radio detection and ranging (RADAR) sensor or a light detection and ranging (LiDAR) sensor.

The vehicle path guiding apparatus radiates an electromagnetic wave to a target in front of the vehicle using the RADAR sensor and receives a signal reflected from the target, thereby acquiring a speed, a direction, and a distance to a lane. By using the RADAR sensor, the vehicle path guiding apparatus acquires the lane irrespective of a weather condition and also acquires a lane in a relatively long distance.

The vehicle path guiding apparatus radiates a laser to the target in front of the vehicle using the LiDAR sensor and receives a signal reflected from the target, thereby acquiring a speed, a direction, and a distance to the lane. The vehicle path guiding apparatus uses the laser that is a pulse signal having a high energy density and a short period so as to more accurately acquire the speed, the direction, and the distance to the lane.

In operation 308, the vehicle path guiding apparatus acquires lane location information based on the second sensor data. The vehicle path guiding apparatus detects the lane by performing image processing on data received from the RADAR sensor or the LiDAR sensor. The vehicle path guiding apparatus removes noise by preprocessing the second sensor data and distinguishes between a detection area and a background area. The vehicle path guiding apparatus extracts a feature point from the detection area. The vehicle path guiding apparatus detects a lane using the extracted feature point and acquires lane location information.

In operation 330, the vehicle path guiding apparatus analyzes the lane based on the ambient image of the vehicle. For example, in operation 331, the vehicle path guiding apparatus three-dimensionally analyzes the lane based on the lane location information and the distance information of the vehicle acquired from the multi-view image. In operation 333, the vehicle path guiding apparatus generates a lane model based on a result of the analyzing of the lane in operation 331, and determines a driving lane in the lane model. The vehicle path guiding apparatus determines a driving lane of the vehicle from lanes detected based on the speed, the direction, and the distance to the lane. The vehicle path guiding apparatus three-dimensionally models a lane around the vehicle based on the lane location information and the multi-view image.

In operation 340, the vehicle path guiding apparatus laterally corrects the vehicle path information generated based on a location of the determined driving lane. Location information acquired based on the first sensor data has a road-level accuracy and may not have a lane-level accuracy. When the longitudinal correction is performed, a longitudinal accuracy increases and thus, a lateral accuracy is at a road level. The lateral accuracy may be increased by adjusting the vehicle location information based on a location of the driving lane of the vehicle among lanes included in a road.

In operation 350, the vehicle path guiding apparatus generates 3D guide information including the corrected vehicle path information. The 3D guide information includes guide information including, for example, an indication of a direction matching the forward image of the driving point of view. The 3D guide information includes driving information, for example, a speed of a vehicle, the number of revolutions of an engine, and a fuel state. The 3D guide information includes traffic information, for example, a speed limit, a presence of a speed bump, and a distance from a facility for driving such as a tollgate, or a gas station. In addition to the traffic information, the 3D guide information also includes information about, for example, a weather condition, a time, and a public facility such as a hospital, a bank, or a shopping mall. The 3D guide information is indicated by, for example, graphics such as an arrow, an icon, and a text. The 3D guide information additionally includes auditory information based on visual information.

Figure 4A:
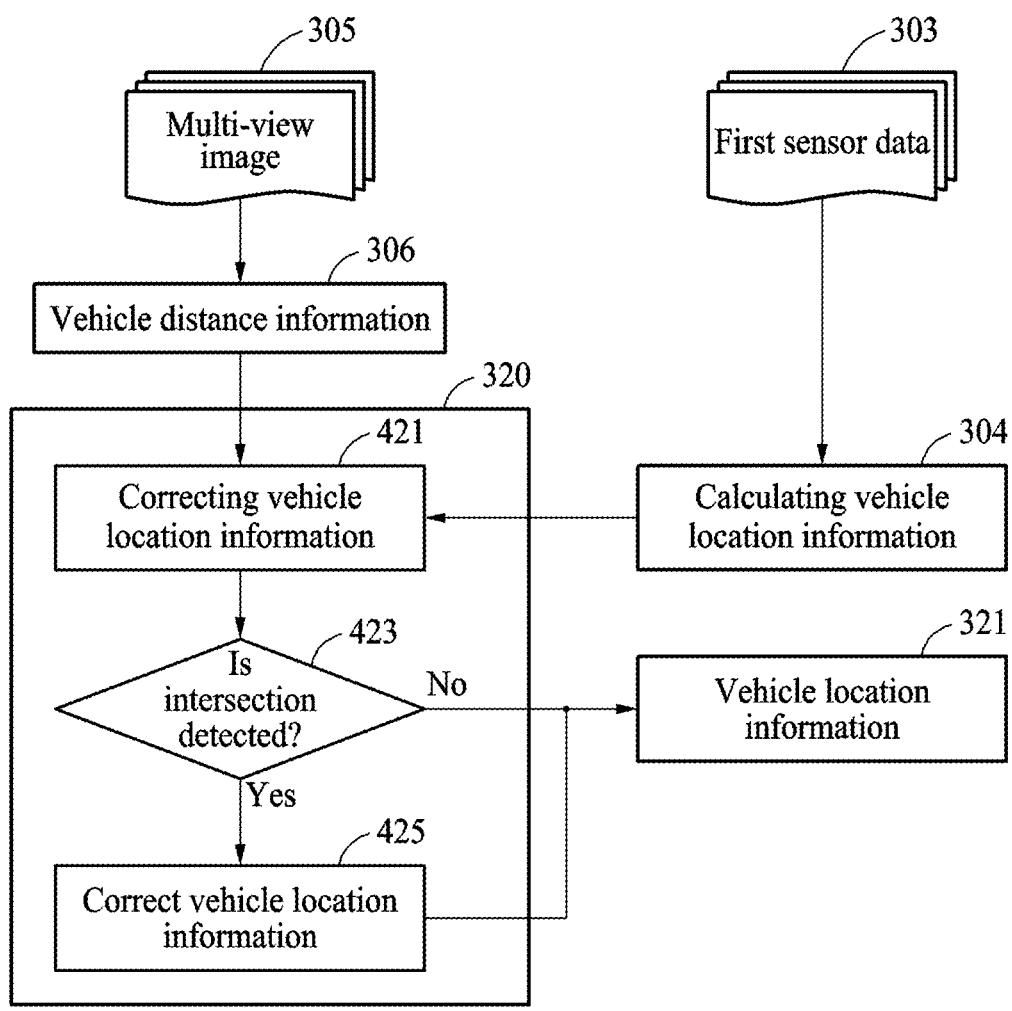
FIG. 4A illustrates an example of longitudinal correction in a vehicle path guiding method.

FIG. 4A illustrates an example of longitudinal correction in a vehicle path guiding method.

Referring to FIG. 4A, the vehicle path guiding apparatus receives first sensor data from a GPS in operation 303 and calculates vehicle location information in operation 304. The vehicle path guiding apparatus acquires a multi-view image from a stereo camera in operation 305 and extracts distance information of a vehicle by performing an image processing on the multi-view image.

In operation 320, the vehicle path guiding apparatus longitudinally corrects the vehicle location information based on the distance information of the vehicle. The vehicle path guiding apparatus performs a first longitudinal correction in operation 421 and performs a second longitudinal correction in operation 425. Through operation 425, the vehicle path guiding apparatus compensates for a cumulative error occurring in operation 421.

In operation 421, the vehicle path guiding apparatus corrects the vehicle location information based on driving information or the distance information of the vehicle. The vehicle path guiding apparatus corrects the vehicle location information while generating a map. The vehicle path guiding apparatus generates a nearby map based on the distance information or the driving information. The vehicle path guiding apparatus compares the vehicle location information to the nearby map. The vehicle path guiding apparatus corrects the vehicle location information based on a result of the comparison of the vehicle location information to the nearby map.

For example, the vehicle path guiding apparatus calculates the distance information of the vehicle through a visual simultaneous localization and mapping (SLAM). The visual SLAM is a position detecting scheme in which a process of generating a 3D map of an ambient environment and a process of acquiring a location itself are complementarily performed. The vehicle path guiding apparatus uses the visual SLAM to generate a 3D map of an environment around the vehicle while acquiring a location of the vehicle. The 3D map of the environment around the vehicle is also referred to as the nearby map. The vehicle path guiding apparatus generates the nearby map using the distance information of the vehicle calculated from the multi-view image based on the vehicle location information acquired from the satellite navigation system. The vehicle path guiding apparatus corrects the vehicle location information using the nearby map. The vehicle path guiding apparatus increases an accuracy of the vehicle location information by repeating the foregoing process.

In operation 423, the vehicle path guiding apparatus detects whether an intersection is present in the multi-view image. When the intersection is absent, in operation 321, the vehicle path guiding apparatus outputs the vehicle location information on which the first correction is performed in a longitudinal direction. When the intersection is detected, in operation 321, the vehicle path guiding apparatus outputs the vehicle location information on which a second correction is performed.

When the intersection is detected, in operation 425, the vehicle path guiding apparatus corrects the vehicle location information based on location information of the intersection to increase the accuracy of the vehicle location information. When the vehicle travels near the intersection, the vehicle path guiding apparatus detects the intersection from the multi-view image of the environment around the vehicle. The vehicle path guiding apparatus performs stereo matching on the multi-view image and extracts depth information of an area including the intersection. The vehicle path guiding apparatus calculates a distance between the vehicle and the intersection based on the depth information.

The vehicle path guiding apparatus compares the distance calculated using the multi-view image and a distance between the vehicle and the intersection acquired from the satellite navigation system and corrects the vehicle location information based on a result of the comparison to the distance calculated using the multi-view image and a distance between the vehicle and the intersection acquired from the satellite navigation system. For example, the vehicle path guiding apparatus matches the intersection on a 2D map used as a reference of the satellite navigation system and an intersection represented on the 3D map of the environment around the vehicle which is generated through the visual SLAM.

The vehicle path guiding apparatus also corrects the vehicle location information based on location information of a landmark on a driving path instead of using the location information of the intersection. For example, when a building represented on the 2D map is detected from the multi-view image, the vehicle path guiding apparatus corrects the vehicle location information by matching the detected building to the 2D map. Also, when a road shape represented on the 2D map is detected from the 3D map of the environment around the vehicle generated through the visual SLAM, the vehicle path guiding apparatus corrects the vehicle location information by matching the detected road shape to the 2D map. The landmark is also referred to as a way point or a point of interest (POI).

When the vehicle is travelling while the forward image is captured from the vehicle, a sequence of the forward image is generated and thus, longitudinal information is to be abundantly generated through a visual odometry. The vehicle path guiding apparatus calculates a translation motion and a rotation motion of the vehicle based on distance information between the vehicle and a captured target in front of the vehicle, and corrects the vehicle location information in the longitudinal direction. The correcting of the vehicle location information based on the visual odometry is not limited to being performed in the longitudinal direction and, thus, is also performed in a lateral direction. For example, when an image is captured in the lateral direction of the vehicle using a stereo camera, the distance information of the vehicle calculated through the visual odometry may be based on the lateral direction.

Figure 4B:
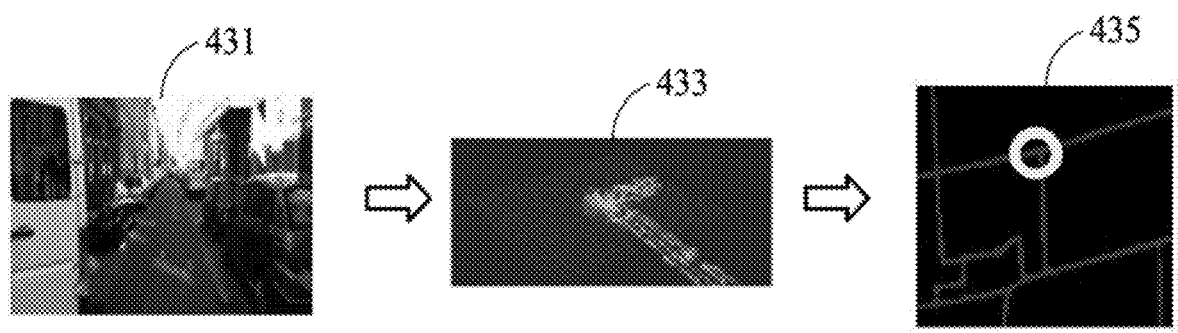
FIG. 4B illustrates an example of vehicle location information corrected in a longitudinal direction.

FIG. 4B illustrates an example of vehicle location information corrected in a longitudinal direction.

Referring to FIG. 4B, a vehicle path guiding apparatus receives a first viewpoint image 431 and a second viewpoint image (not shown) from stereo cameras corresponding to different points of view. The first viewpoint image 431 and the second viewpoint image are included in a multi-view image.

The vehicle path guiding apparatus extracts a matching point by performing stereo matching on the multi-view image. The vehicle path guiding apparatus acquires depth information based on the matching point. The vehicle path guiding apparatus converts the depth information into distance information based on a parameter associated with a capturing condition.

The vehicle path guiding apparatus extracts distance information 433 associated with a road using a trained recognizer. The trained recognizer is trained to extract distance information associated with a road based on a great amount of learning data. The vehicle path guiding apparatus generates a map 435 of a road around a vehicle by connecting items of distance information associated with a road.

The vehicle path guiding apparatus detects an intersection from the map 435. The vehicle path guiding apparatus detects an intersection closest to the vehicle or intersections located within a predetermined distance from the vehicle. When the number of detected intersections increases, an accuracy of correcting the vehicle location information also increases. In this example, a range of the map 435 may need to be increased and, thus, an amount of resources to be used may also increase. The vehicle path guiding apparatus selects a reference appropriated for a real-time navigation service from a preset accuracy and a limited amount of resources.

Figure 5A:
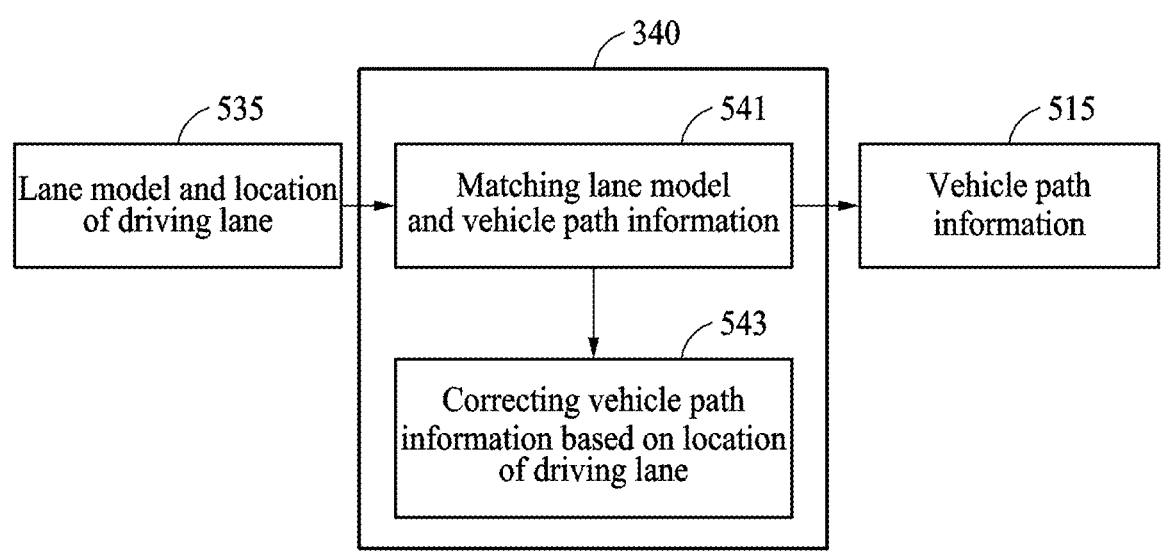
FIG. 5A illustrates an example of lateral correction in a vehicle path guiding method.

FIG. 5A illustrates an example of lateral correction in a vehicle path guiding method.

Referring to FIG. 5A, in operation 535, the vehicle path guiding apparatus receives location information of a driving lane and a lane model. The location information of the driving lane and the lane model is acquired by analyzing vehicle distance information extracted from an ambient image and lane location information extracted from second sensor data received through a RADAR sensor or a LiDAR sensor. The lane model has an accuracy sufficient to identifying a lane on a road from a 3D road model.

In operation 340, the vehicle path guiding apparatus corrects vehicle path information. The vehicle path information may have an accuracy sufficient to identify a road before being corrected. Since the location information of the driving lane and the lane model is location information associated with lanes arranged in a lateral direction of a road, the vehicle path guiding apparatus uses the location information of the driving lane and the lane model to increase the accuracy of the vehicle path information in the lateral direction.

In operation 541, the vehicle path guiding apparatus matches the vehicle path information and the lane model generated based on the ambient image. The lane model may be a lane model from which information on an ambient environment is removed to reduce an amount of data. The vehicle path information is provided based on a 3D map. The 3D map is obtained through a conversion performed based on a 2D map instead of being autonomously obtained using a laser scanner or a camera. Also, the 3D map is obtained through a conversion performed based on information required for a matching with a lane model from information included in the 2D map. Thus, the 3D map is smaller in size than a 3D map obtained using the laser scanner or the camera. The vehicle path guiding apparatus matches a road on the 3D map and a road of the lane model.

In one example, the vehicle path information is also provided based on the 2D map. In this example, the lane model includes a 2D lane model, and the vehicle path guiding apparatus matches the lane model and the vehicle path information provided based on the 2D map. The vehicle path guiding apparatus converts a matching result into a 3D image corresponding to a point of view for driving to provide an augmented reality.

In operation 543, the vehicle path guiding apparatus corrects the vehicle path information based on a location of a driving lane with respect to the lane model. The lane location information is provided based on the lane model. The vehicle path information is provided based on the 3D map. In response to the matching between the road of the lane model and the road of the 3D map, the vehicle path information is corrected based on location information of the driving lane. The vehicle path guiding apparatus corrects the vehicle path information on the 3D map using a relative location of the driving lane in the lane model.

The vehicle path guiding apparatus outputs the corrected vehicle path information in operation 515. The vehicle path guiding apparatus extracts information on a path from a current location of a vehicle to a subsequent junction, from the corrected vehicle path information. The vehicle path guiding apparatus generates 3D guide information by processing the extracted information. The 3D guide information includes, for example, a driving time, a distance, and a direction to the subsequent junction. Also, the 3D guide information includes, for example, a speed limit applied on the way of the subsequent junction, a speed bump on the way of the subsequent junction, and a distance from a facility for driving such as a tollgate, or a gas station.

Figure 5B:
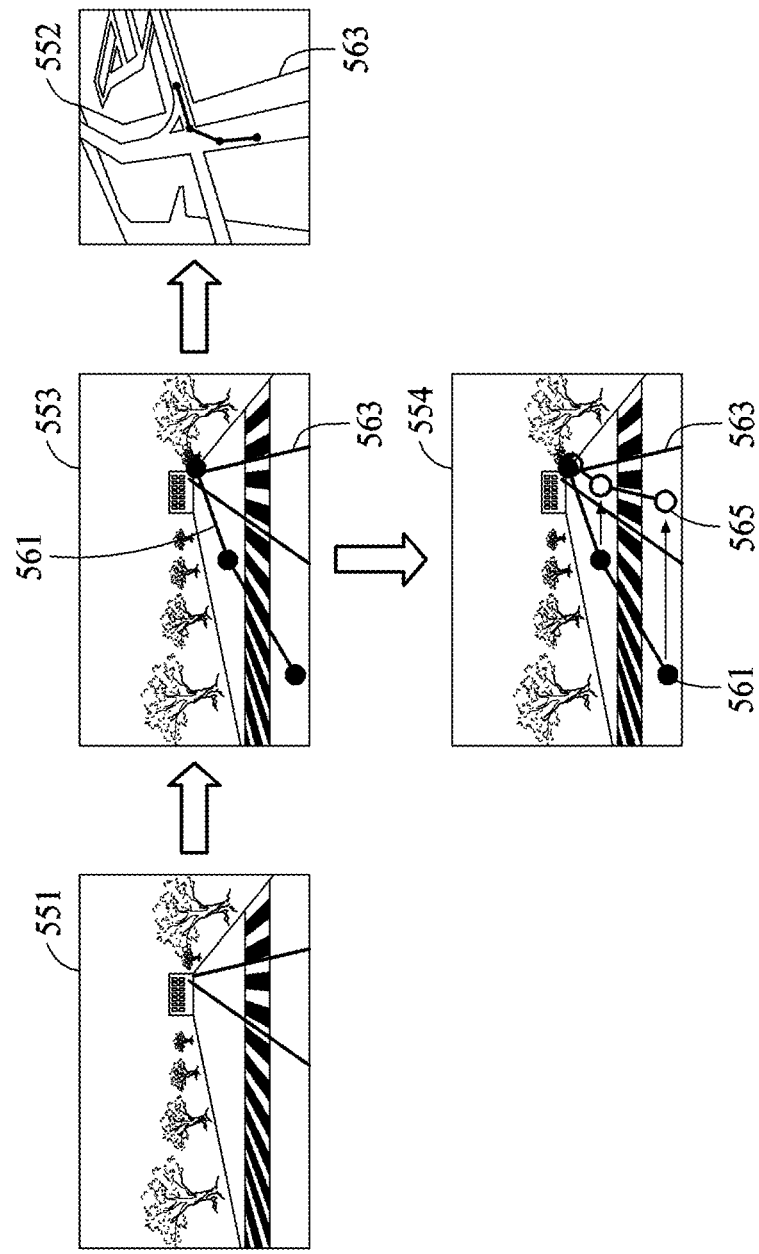
FIG. 5B illustrates an example of vehicle location information corrected in a lateral direction, and vehicle path information corrected based on the corrected vehicle location information.

FIG. 5B illustrates an example of vehicle location information corrected in a lateral direction and vehicle path information corrected based on the corrected vehicle location information.

Referring to FIG. 5B, a view 551 represents a lane model mapped to a forward image corresponding to a driving point of view of a user. The lane model includes a lane and a boundary of a road. The lane model may not include a background such as a roadside tree and a building. Also, the lane model may not include traffic information, such as a crosswalk, other than a lane.

In FIG. 5B, a view 552 represents 3D vehicle path information obtained through a conversion performed based on vehicle path information that is determined based on a 2D map corresponding to a 3D map into which the 2D map is converted. The 3D map is obtained through a conversion performed on the 2D map using a feature point required for a matching with the lane model. The vehicle path information of the view 552 is 3D information obtained through a conversion performed based on the driving point of view.

Still referring to FIG. 5B, a view 553 represents a result of matching between the view 551 and the view 552. The vehicle path guiding apparatus matches the lane model of the view 551 and a road of the view 552. The vehicle path guiding apparatus maps vehicle path information 561 and a lane model of the view 553 based on a relationship between a road on a 3D map and vehicle path information. The lane model includes a driving lane 563.

Referring again to FIG. 5B, a view 554 represents vehicle path information 565 obtained by correcting the vehicle path information based on location information of the driving lane 563 in the lane model. The vehicle path information 561 is determined based on first sensor data having a road-level accuracy and thus, does not have a lane-level accuracy. The vehicle path guiding apparatus corrects the vehicle path information 561 to be the vehicle path information 565 based on location information of the driving lane 563 and the lane model. Through this, the vehicle path information achieves the lane-level accuracy in a lateral direction.

Figure 5C:
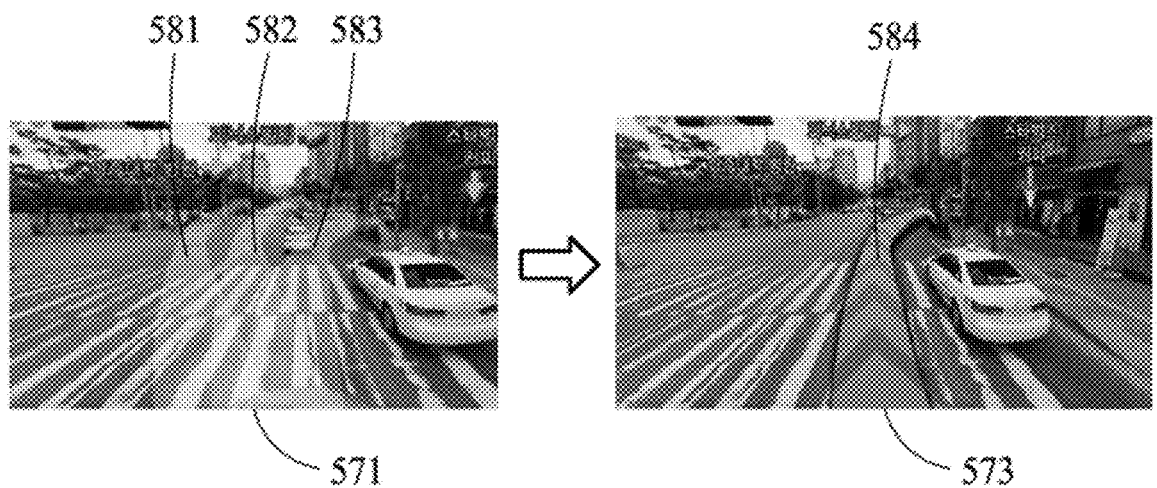
FIG. 5C illustrates an example of vehicle path information corrected in a lateral direction.

FIG. 5C illustrates an example of vehicle path information corrected in a lateral direction in a vehicle path guiding method.

A view 571 represents vehicle path information mapped to a realistic image corresponding to a driving point of view. In this example, the vehicle path information has a road-level accuracy and thus, the vehicle path guiding apparatus may not determine paths 581, 582, and 583 to identify a lane.

A view 573 represents vehicle path information mapped to the realistic image corresponding to the driving point of view. In this example, the vehicle path information has a road-level accuracy. The vehicle path guiding apparatus determines a path 584 from the paths 581, 582, and 583 available in the vehicle path information having the road-level accuracy based on location information of a driving lane. The vehicle path guiding apparatus uses the path 584 to correct the vehicle path information to have the lane-level accuracy.

Figure 6:
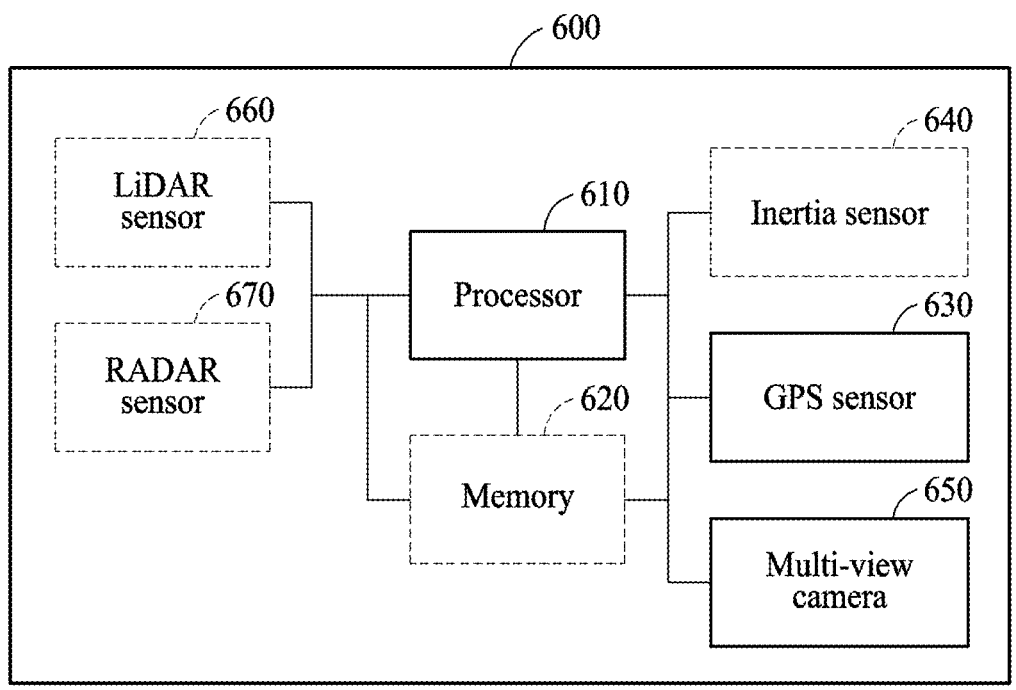
FIG. 6 illustrates an example of a vehicle path guiding apparatus.

FIG. 6 illustrates an example of a vehicle path guiding apparatus 600.

Referring to FIG. 6, the vehicle path guiding apparatus 600 includes a processor 610, a GPS sensor 630, and a multi-view camera 650. In an example, the vehicle path guiding apparatus 600 includes the processor 610 and an input and output (I/O) interface configured to receive first sensor data from an external GPS sensor through the I/O interface and receive a multi-view image from an external multi-view camera through the I/O interface.

In an example, the vehicle path guiding apparatus 600 further includes an inertia sensor 640 as a first sensor. The inertia sensor 640 is also referred to as an IMU. In an example, the vehicle path guiding apparatus 600 further includes a LiDAR sensor 660 or a RADAR sensor 670 as a second sensor. In an example, the vehicle path guiding apparatus 600 further includes a memory 620 and an output device. The output device includes a head-up display or a head-down display as a visual output device, and includes a speaker as an auditory output device.

The memory 620 stores instructions corresponding to operations to be performed by the processor 610. The memory 620 stores data generated while a vehicle path guiding method is performed. The memory 620 stores, for example, first sensor data, vehicle location information extracted from the first sensor data, a multi-view image, vehicle distance information extracted from the multi-view image, second sensor data, vehicle location information extracted from the second sensor data, a 2D map, and/or a lane model generated by performing a lane analysis.

The processor 610 generates vehicle path information for guiding a path along which a vehicle is to be driven based on vehicle location information determined based on the first sensor data. The processor 610 calculates vehicle location information using the first sensor data received from the GPS sensor 630. The processor 610 corrects the vehicle location information using the first sensor data received from the inertia sensor 640 to increase an accuracy of the vehicle location information.

The processor 610 extracts distance information of the vehicle from an ambient image of the vehicle. When the ambient image is a multi-view image, the processor 610 corrects the vehicle location image based on the distance information of the vehicle. The processor 610 performs stereo matching on two images having different points of view to extract depth information, and calculates the distance information of the vehicle. The processor 610 corrects the vehicle location information based on the distance information of the vehicle.

The ambient image includes a forward image. When an intersection is present in the forward image of the vehicle, the processor 610 detects the intersection from the ambient image of the vehicle. When the intersection is detected, the processor 610 corrects the vehicle location information based on location information of the detected intersection. The processor 610 generates path information based on the corrected location information. As such, the vehicle location information is longitudinally corrected based on the distance information of the vehicle or the location information of the intersection.

The processor 610 calculates an optimal path corresponding to a present reference based on destination information and the vehicle location information corrected on the 2D map. The processor 610 converts vehicle path information of the 2D map into that of a 3D map.

The processor 610 determines a driving lane in which the vehicle is travelling based on the ambient image of the vehicle. The processor 610 determines the driving lane using a lane model generated using the ambient image of the vehicle and location information determined based on the second sensor data.

The processor 610 corrects vehicle path information generated based on a location of the determined driving lane. The processor 610 matches the vehicle path information and the lane model generated based on the ambient image. Here, the vehicle path information is, for example, vehicle path information that has been converted into a 3D form. The processor 610 corrects the vehicle path information based on the location of the driving lane with respect to the lane model. Through this operation, the vehicle path information achieves accuracy in the lateral direction.

The processor 610 outputs the corrected vehicle path information through the output device. The processor 610 displays the corrected vehicle path information on the head-up display or the head-down display, and/or outputs the corrected vehicle path information through the speaker.

The processor 610, the memory 620, the GPS sensor 630, the inertia sensor 640, the multi-view camera 650, the LiDAR sensor 660 and RADAR sensor 670 in FIG. 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1A, 1B, 2, 3, 4A, 4B, and 5A-5C that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle path guiding method, comprising:
    determining, based on first sensor data, two-dimensional (2D) coordinate location information of a vehicle;
    determining, based on a landmark included in an ambient image of the vehicle, a distance from the landmark to the vehicle in a direction of travel of the vehicle;
    correcting, based on the determined distance, the 2D coordinate location information in the direction of travel of the vehicle;
    generating, based on the corrected 2D coordinate location information, three-dimensional (3D) vehicle path information for a path along which the vehicle is to be driven;
    determining, based on the ambient image, a driving lane in which the vehicle is travelling;
    correcting, based on a location of the determined driving lane, the generated 3D vehicle path information; and
    displaying the corrected 3D vehicle path information,
    wherein determining of the driving lane comprises generating a lane model by modeling lanes around the vehicle based on the ambient image of the vehicle and location information of the driving lane determined using second sensor data, and determining the driving lane using the generated lane model.

2. The vehicle path guiding method of claim 1, wherein the correcting of the vehicle path information comprises
    matching the vehicle path information and the generated lane model, and
    correcting the vehicle path information based on the location of the driving lane corresponding to the lane model.

3. The vehicle path guiding method of claim 2, wherein the lane model comprises a model from which an ambient environment in the ambient image is removed.

4. The vehicle path guiding method of claim 1, wherein the generating of the vehicle path information comprises
    extracting distance information of the vehicle from the ambient image of the vehicle, including the position of the vehicle in the direction of travel, and
    correcting the location information of the vehicle based on the distance information.

5. The vehicle path guiding method of claim 4, wherein the correcting of the location information comprises
    generating a nearby map based on the distance information,
    comparing the nearby map and the location information of the vehicle, and
    correcting the location information of the vehicle based on a comparison result.

6. The vehicle path guiding method of claim 1, wherein the generating of the lane model comprises
    extracting distance information of the vehicle from the ambient image of the vehicle, and
    generating the lane model based on the distance information and location information of a lane determined using second sensor data.

7. The vehicle path guiding method of claim 6, wherein the second sensor data is acquired from a light detection and ranging (LiDAR) sensor or a radio detection and ranging (RADAR) sensor.

8. The vehicle path guiding method of claim 1, wherein the generating of the vehicle path information comprises
generating vehicle path information of a two-dimensional (2D) map,
converting the 2D map into a three-dimensional (3D) map, and
converting the vehicle path information of the 2D map into vehicle path information of the 3D map based on a result of the converting of the 2D map.

9. The vehicle path guiding method of claim 1, wherein the first sensor data is acquired from an inertial measurement unit (IMU) or a global positioning system (GPS).

10. The vehicle path guiding method of claim 1, wherein the generating of the vehicle path information comprises
detecting the landmark in the ambient image of the vehicle,
correcting the location information of the vehicle based on location information of the detected landmark, and
generating the vehicle path information based on the corrected location information.

11. A vehicle path guiding method, comprising:
generating, based on two-dimensional (2D) location information of a vehicle determined using first sensor data, three-dimensional (3D) vehicle path information for a path along which the vehicle is to be driven;
determining, based on an ambient image of the vehicle, a driving lane in which the vehicle is travelling;
correcting, based on a location of the determined driving lane, the generated 3D vehicle path information; and
displaying the corrected 3D vehicle path information,
wherein the generating of the vehicle path information comprises
detecting a landmark in the ambient image of the vehicle,
correcting the 2D location information of the vehicle based on location information of the detected landmark, and
generating the 3D vehicle path information based further on the corrected 2D location information,
wherein determining of the driving lane comprises generating a lane model by modeling lanes around the vehicle based on the ambient image of the vehicle and lane location information, and determining the driving lane using the generated lane model.

12. The vehicle path guiding method of claim 11, wherein the detecting of the landmark comprises
extracting distance information of the vehicle from the ambient image of the vehicle,
generating a nearby map based on the distance information, and
detecting an intersection as the landmark using the nearby map.

13. A non-transitory computer-readable storage medium storing instructions that, when executed by a processor, cause the processor to perform the method of claim 1.

14. A vehicle path guiding apparatus comprising:
a processor configured to:
determine, based on first sensor data, two-dimensional (2D) coordinate location information of a vehicle,
determine, based on a landmark included in an ambient image of the vehicle, a distance from the landmark to the vehicle in a direction of travel of the vehicle,
correct, based on the determined distance, the 2D coordinate location information in the direction of travel of the vehicle,
generate, based on the corrected 2D coordinate location information, three-dimensional (3D) vehicle path information for a path along which the vehicle is to be driven,
determine, based on the ambient image, a driving lane in which the vehicle is travelling,
correct, based on a location of the determined driving lane, the generated 3D vehicle path information based on a location of the driving lane, and
display the corrected 3D vehicle path information,
wherein the processor is further configured to generate a lane model by modeling lanes around the vehicle based on the ambient image of the vehicle and location information of a lane determined using second sensor data, and to determine the driving lane using the generated lane model.

15. The vehicle path guiding apparatus of claim 14, wherein the processor is further configured to
match the vehicle path information and the generated lane model, and
correct the vehicle path information based on the location of the driving lane corresponding to the lane model.

16. The vehicle path guiding apparatus of claim 14, wherein the processor is further configured to
detect the landmark in the ambient image of the vehicle,
correct the location information of the vehicle based on location information of the detected landmark, and
generate the vehicle path information based on the corrected location information.

17. The vehicle path guiding apparatus of claim 14, wherein the processor is further configured to
extract distance information of the vehicle from the ambient image of the vehicle, and
correct the location information of the vehicle based on the distance information.

18. The vehicle path guiding apparatus of claim 14, further comprising:
an inertial measurement unit (IMU) or a global positioning system (GPS) configured to acquire the first sensor data.

19. The vehicle path guiding apparatus of claim 14, further comprising:
a light detection and ranging (LiDAR) sensor or a radio detection and ranging (RADAR) sensor configured to acquire the second sensor data.

20. A vehicle path guiding method, comprising:
determining, using global positioning system (GPS) data, two-dimensional (2D) location information of a vehicle;
determining, based on a landmark included in an ambient image of the vehicle, a distance from the landmark to the vehicle in a direction of travel of the vehicle;
correcting, based on the determined distance, the 2D location information in the direction of travel of the vehicle;
generating, based on the corrected 2D location information, three-dimensional (3D) vehicle path information for a driving path of the vehicle, wherein the vehicle path information comprises a road-level accuracy;
determining, based on the ambient image, a driving lane in which the vehicle is travelling;
correcting, based on a location of the determined driving lane, the generated 3D vehicle path information; and outputting the corrected vehicle path information through any one or both of a display and a speaker, wherein determining of the driving lane comprises generating a lane model by modeling lanes around the vehicle based on the ambient image of the vehicle and lane location information, and determining the driving lane using the generated lane model.

21. The method of claim 20, wherein the image comprises a multi-view image.

22. The method of claim 21, further comprising:
detecting an intersection as the landmark in the multi-view image; and
correcting the location information of the vehicle based on a distance between the vehicle and the intersection.

23. The method of claim 20, wherein the generating of the vehicle path information comprises converting vehicle path information of a 2D map into vehicle path information of a 3D map.

* * * * *